UNITED STATES PATENT OFFICE.

JAMES P. A. McCOY, OF WILKINSBURG, PENNSYLVANIA, ASSIGNOR TO WESTINGHOUSE ELECTRIC AND MANUFACTURING COMPANY, A CORPORATION OF PENNSYLVANIA.

HALOGENATED RESINOUS COMPOUND.

1,245,363.    Specification of Letters Patent.    Patented Nov. 6, 1917.

No Drawing.    Application filed February 3, 1916. Serial No. 76,019.

*To all whom it may concern:*

Be it known that I, JAMES P. A. McCOY, a subject of the King of Great Britain, and a resident of Wilkinsburg, in the county of Allegheny and State of Pennsylvania, have invented a new and useful Improvement in Halogenated Resinous Compounds, of which the following is a specification.

My invention relates to the preparation of halogenated resins and it has special relation to halogenated compounds prepared from resinous coal tar derivatives.

The object of my invention is to prepare halogen substitution products, having valuable technical properties, from the resinous coal tar derivatives which are described in my copending application for Letters Patent, Serial No. 20,752, filed April 12, 1915, and which consist chiefly of cumarone, indene, para-cumarone, and para-indene. In particular, it is my object to prepare chlorin substitution products from these coal tar resins, in the form of waxy bodies, which, when melted, are very mobile fluids and are therefore well suited for use in the impregnation of porous materials.

In preparing chlorinated resins in accordance with my invention, I may proceed by melting the coal tar resins mentioned above and passing chlorin gas through the molten material. The molecules composing the para-resins contain four replaceable hydrogen atoms, and one or more of these atoms may be replaced by chlorin by suitably varying the time of treatment with gaseous chlorin and also by varying the conditions under which the chlorin is applied. For example, the higher degrees of chlorination may be more readily obtained by carrying out the chlorinating process in an autoclave.

Chlorinated para-resins containing two chlorin atoms in each molecule may be prepared by passing gaseous chlorin through the melted resins, which should be maintained at about 120° C. under atmospheric pressure. The application of chlorin, under these circumstances, should be continued for about eight hours.

The chlorination products produced in the foregoing manner are waxy bodies which, on cooling, exhibit a distinct crystalline structure. Their waxy characteristics may be increased by the addition of other bodies such as stearic acid or other acids of the fatty series which may, if desired, be themselves halogenated before being mixed with the chlorinated para-resins.

One useful application of the halogenated waxy bodies produced in the above manner is in the manufacture of impregnated textile materials such as the dielectric portions of electric condensers. For this purpose, the halogenated resins are melted and the material to be impregnated is immersed in the resulting liquid one or more times. Since the liquid is nearly as mobile as water, the impregnation is very thorough. The great fluidity of these halogenated bodies is particularly important in the impregnation of condensers which are made by stacking alternate sheets of conducting material and paper or other absorbent substance and then impregnating the stacked material as a unit. These halogenated resins penetrate such a structure in a very thorough manner and, in addition, possess highly satisfactory dielectric properties.

The para-resins described above are capable of taking up bromin and iodin as substitutents as well as chlorin, and it is to be understood that my invention comprehends the substitution products of all of the halogens. It is also to be understood that the process steps mentioned above are merely illustrative and that others may be utilized without exceeding the limits of my invention, which is not to be restricted except as indicated in the appended claims.

I claim as my invention:

1. A halogen substitution product of a resinous coal-tar derivative containing cumarone, indene, para-cumarone and para-indene.

2. A chlorin substitution product of a resinous coal-tar derivative containing cumarone, indene, para-cumarone and para-indene.

3. A halogen substitution product of a resinous coal-tar derivative containing at least one of the following substances: cumarone, indene, para-cumarone and para-indene.

4. A chlorin substitution product of a resinous coal-tar derivative containing at least one of the following substances: cumarone, indene, para-cumarone and para-indene.

5. A chlorin di-substituton product of a resinous coal-tar derivative containing at least one of the following substances: cumarone, indene, para-cumarone and para-indene.

6. The process of making chlorin substitution products that comprises passing gaseous chlorin through a melted coal-tar derivative containing at least one of the following substances: cumarone, indene, para-cumarone and para-indene.

7. The process of making chlorin substitution products that comprises passing gaseous chlorin through a melted coal-tar derivative containing at least one of the following substances: cumarone, indene, para-cumarone and para-indene, the said melted material being maintained at approximately 120° C.

8. The process of making chlorin di-substitution products that comprises passing gaseous chlorin for a period of approximately eight hours through a melted coal-tar derivative containing at least one of the following substances: cumarone, indene, para-cumarone and para-indene.

In testimony whereof, I have hereunto subscribed my name this 27th day of Jan., 1916.

JAMES P. A. McCOY.